US010557573B2

(12) United States Patent
Twelves et al.

(10) Patent No.: US 10,557,573 B2
(45) Date of Patent: Feb. 11, 2020

(54) FEED THROUGH SEALS AND FITTINGS

(71) Applicant: United Technologies Corporation, Farmington, CT (US)

(72) Inventors: Wendell V. Twelves, Glastonbury, CT (US); Evan Butcher, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 341 days.

(21) Appl. No.: 15/344,343

(22) Filed: Nov. 4, 2016

(65) Prior Publication Data

US 2018/0128400 A1 May 10, 2018

(51) Int. Cl.
*F16L 5/10* (2006.01)
*H02G 15/013* (2006.01)
*H02G 3/22* (2006.01)

(52) U.S. Cl.
CPC .................. *F16L 5/10* (2013.01); *H02G 3/22* (2013.01); *H02G 15/013* (2013.01)

(58) Field of Classification Search
CPC ....... F16L 5/02; F16L 5/04; F16L 5/06; F16L 5/10
USPC ......... 285/285.1, 286.1, 295.1, 295.3, 296.1, 285/204, 205, 206, 207, 208
See application file for complete search history.

(56) References Cited

U.S. PATENT DOCUMENTS

| | | | | |
|---|---|---|---|---|
| 1,110,947 A | * | 9/1914 | Lampert | F16L 25/026 164/94 |
| 4,560,189 A | * | 12/1985 | Lang | F16L 5/02 285/136.1 |
| 5,442,140 A | * | 8/1995 | McGrane | F16L 5/10 174/151 |
| 7,455,325 B2 | * | 11/2008 | Mejlhede | A61M 39/12 285/285.1 |
| 7,918,486 B2 | * | 4/2011 | Preisendorfer | F16L 41/088 285/136.1 |
| 8,276,947 B2 | * | 10/2012 | Smahl | F16L 47/24 285/285.1 |
| 8,840,148 B2 | * | 9/2014 | Defilippi | F16L 41/008 285/133.21 |

(Continued)

FOREIGN PATENT DOCUMENTS

DE 10053115 C1 4/2002
EP 1580471 A2 9/2005
(Continued)

OTHER PUBLICATIONS

Communication Pursuant to Article 94(3) EPC from Appln. Serial No. 17200007.7, dated Nov. 30, 2018, 5 pages.

(Continued)

*Primary Examiner* — Aaron M Dunwoody
(74) *Attorney, Agent, or Firm* — Kinney & Lange, P.A.

(57) ABSTRACT

An embodiment of a fitting assembly includes a fitting having at least a solid outer body, a pass-through bore, and at least one undercut region. The pass-through bore is defined by at least one pass-through bore wall, extending longitudinally through a length of the outer body from a first end to a second end. The at least one undercut region is formed into the at least one pass-through bore wall, and includes at least one expansion bearing surface disposed radially outward of at least one contraction bearing surface.

20 Claims, 5 Drawing Sheets

(56) References Cited

U.S. PATENT DOCUMENTS

| | | | | |
|---|---|---|---|---|
| 2004/0155457 | A1* | 8/2004 | Mejlhede | A61M 39/12 285/21.1 |
| 2007/0273107 | A1* | 11/2007 | Beele | F16L 5/10 277/607 |
| 2008/0299446 | A1* | 12/2008 | Kelly | H01M 2/1077 429/88 |
| 2009/0044474 | A1* | 2/2009 | Condon | F16L 5/02 52/404.1 |
| 2009/0218132 | A1* | 9/2009 | Delakowitz | F16L 5/10 174/669 |
| 2009/0315275 | A1* | 12/2009 | Beele | F16L 5/10 277/626 |
| 2010/0059941 | A1* | 3/2010 | Beele | F16L 5/10 277/606 |
| 2010/0109259 | A1* | 5/2010 | Cayzac | B60R 16/0222 277/606 |
| 2011/0018210 | A1* | 1/2011 | Beele | F16L 5/10 277/606 |
| 2013/0106060 | A1* | 5/2013 | Beele | F16L 5/10 277/314 |
| 2013/0257041 | A1 | 10/2013 | Peirce | |
| 2013/0292911 | A1* | 11/2013 | Graef | H02G 3/22 277/606 |
| 2014/0361493 | A1 | 12/2014 | Short et al. | |
| 2015/0292649 | A1* | 10/2015 | Beele | F16L 5/10 277/606 |

FOREIGN PATENT DOCUMENTS

| | | |
|---|---|---|
| EP | 2276040 A1 | 1/2011 |
| EP | 2445073 A1 | 4/2012 |
| GB | 998128 A | 7/1965 |
| GB | 2407352 A | 4/2005 |

OTHER PUBLICATIONS

Extended European Search Report for EP Application No. 17200007.7, dated Mar. 28, 2018, 9 pages.

Communication Pursuant to Article 94(3) EPC for EP Application No. 17200007.7, dated Jul. 8, 2019, 5 pages.

\* cited by examiner

FEED THROUGH SEALS AND FITTINGS

BACKGROUND

The disclosed subject matter relates generally to fittings and seals, and more specifically to fittings and seals with one or more feed-through sections.

Wire, cable, and tubing feed through fittings are used in various applications, including but not limited to engine, commercial, manufacturing, and industrial applications. Often one or more wires, cables, or tubes need to be fed through a wall, housing, baffle, etc., which separates different environments.

A feed-through typically performs one or more functions. It can act as a hermetic seal that prevents leakage of gas or fluids through the wall. It can cushion and protect wires, cables, and/or tubes from chaffing and cutting damage. It can provide strain relief. However, the CTE (Coefficient of Thermal Expansion) of flexible sealant materials (primarily polymers) is universally much greater than the CTE of metal or composite materials used to construct feed-through fitting bodies. This difference can result in the sealant pulling away from the wall of the bore in the fitting body during or after repeated thermal excursions, allowing unintended ingress or egress from the vessel through the fitting body/bore.

SUMMARY

An embodiment of a fitting assembly includes a fitting having at least a solid outer body, a pass-through bore, and at least one undercut region. The pass-through bore is defined by at least one pass-through bore wall, extending longitudinally through a length of the outer body from a first end to a second end. The at least one undercut region is formed into the at least one pass-through bore wall, and includes at least one expansion bearing surface disposed radially outward of at least one contraction bearing surface.

An embodiment of a method includes supporting a fitting in a fixture and inserting a filler plug into a first end of a pass-through bore in a fitting. An elongated structure is inserted through the pass-through bore and the filler plug. A liquid-phase filler material is introduced into a second end of the outer body. The liquid-phase filler material substantially fills the pass-through bore and at least one undercut region formed into at least one pass-through bore wall surrounding a portion of the elongated structure in the pass-through bore. The liquid-phase filler material is solidified to form a flexible filler material substantially occupying a volume of the pass-through bore and the undercut region, supporting the elongated structure for providing communication between a first volume and a second volume.

DETAILED DESCRIPTION

Figure 1:
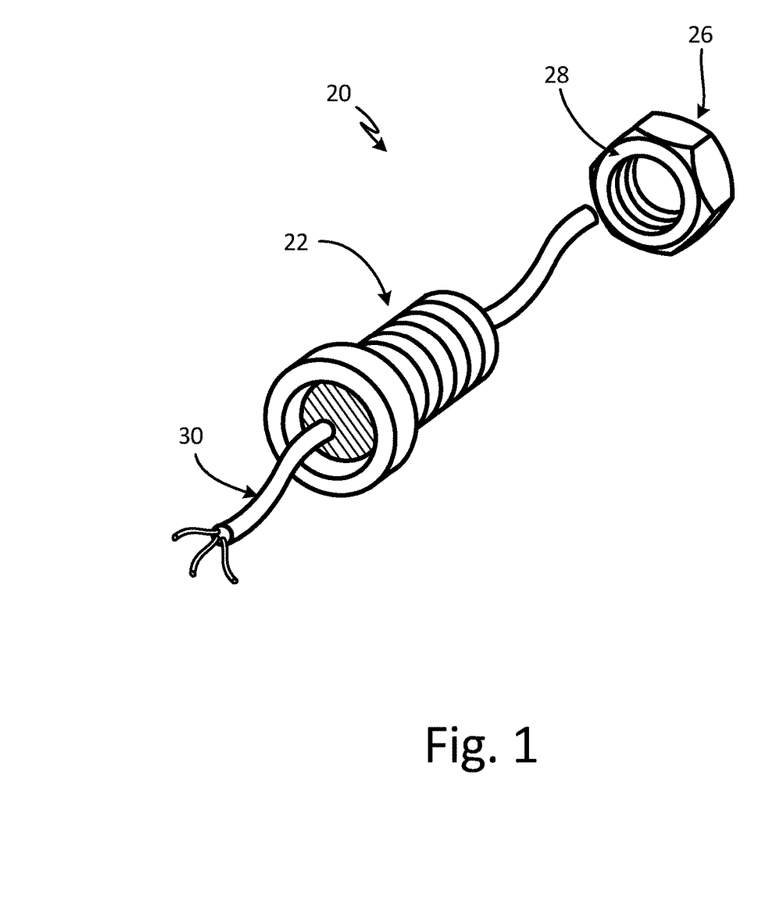
FIG. 1 is an isometric view of a cable and feed-through fitting for an apparatus.

FIG. 1 is an isometric view of a cable and feed-through fitting assembly for an apparatus. The following is but one exemplary application of the present disclosure. Fitting assembly 20 can include a feed-through fitting 22, and one or more fasteners. Fitting 22 is shown as, but is not limited to, a threaded screw- or bolt-like member, held against a wall of the apparatus (shown in FIG. 2) via complementary nut member 26, and one or more washers or gaskets 28. Elongated structure 30, e.g., a wire, cable, or tube provides communication through the wall (shown in FIG. 2). Examples of applications include feeding wires from a harsh environment through the wall of an enclosure for sensitive electronic equipment, feeding wires through an oil or fuel tank wall, and feeding wires or tubing through the wall or bulkhead of a pressurized aircraft cabin.

Figure 2:
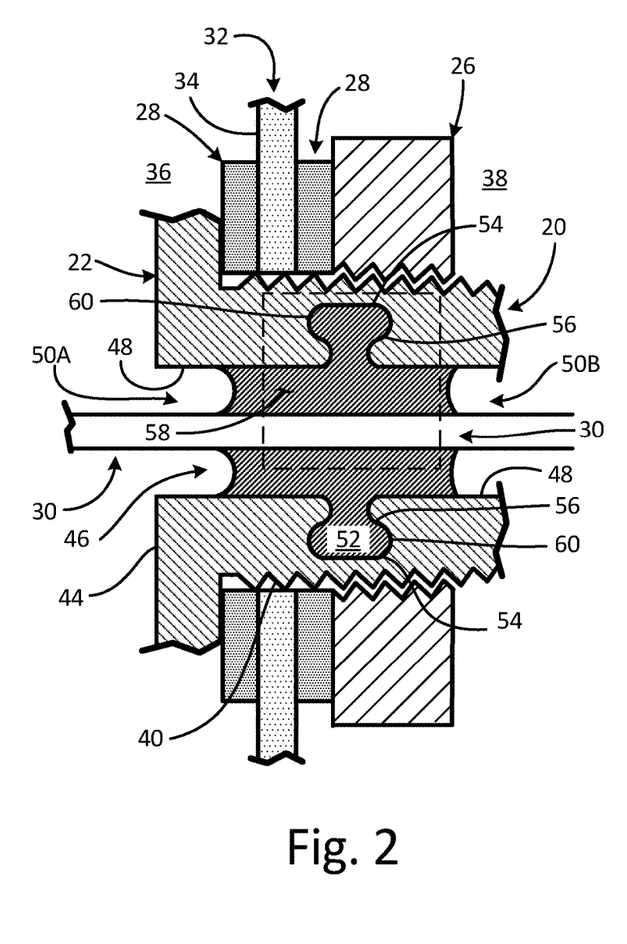
FIG. 2 is a cross-sectional view of a cable and feed-through fitting for an apparatus.

FIG. 2 shows a cross-sectional view of fitting assembly 20 secured to apparatus 32. Apparatus 32 includes at least one wall 34 separating first volume 36 and second volume 38 to be sealed therefrom. Wall 34, which can be for example, a housing, bulkhead, baffle, or other includes at least one opening 40 into which at least one fitting assembly 20 is to be installed for passage of elongated structure 30 while maintaining a substantially or completely hermetic seal between first volume 36 and second volume 38. Elongated structure 30 can be one or more wires, cables, and/or tubes providing fluid, electrical, and/or signal communication therethrough. Apparatus 32 can be any type of equipment, vessel, housing, etc., whereby either multiple internal volumes are to be separated, or whereby an internal volume is to be separated from ambient conditions outside the apparatus while maintaining the above communication via structure 30.

Depending on the particular application, at least one of first and second volumes 36, 38 can operate in a vacuum. In certain embodiments, one of first and second volumes 36, 38 operates in a partial vacuum, while the other operates in a substantially complete vacuum (e.g., less than $10^{-5}$ torr). Examples include, but are not limited to, electron microscopes, additive manufacturing equipment, vapor deposition equipment, vacuum furnaces, rockets, satellites, aircraft, spacecraft, etc. In certain embodiments, at least one of first and second volumes 36, 38 operates in a positive-pressure environment (e.g., more than 1 atm). In certain of these embodiments, first and second volumes 36, 38 have a pressure differential of at least 100 kPa therebetween. Examples include but are not limited to environmental protection enclosures, autoclaves, hot isostatic processing (HIP) furnaces, high pressure food processing (pasteurization) equipment, and equipment for deep sea operations such as submersibles, oil drilling, instrumentation, etc.

Feed-through fitting 22 is held in place within opening 40, against wall 34 via complementary nut member 26 and one or more washers or gaskets 28. Feed-through fitting 22 generally has solid outer body 44, through which pass-through bore 46 is formed. Bore 46 is defined by at least one pass-through bore wall 48, extending longitudinally through a length of outer body 44 from first end 50A to second end 50B. At least one undercut region 52 can be formed into an outer wall (e.g., pass-through bore wall 48). Undercut region(s) 52 can include at least one expansion bearing surface 54 disposed radially outward of at least one contraction bearing surface 56. Expansion bearing surface(s) 54 and contraction bearing surface(s) 56 can converge at radiused corner(s) 60 to define a dovetail undercut. Radiused corners can reduce stresses from sharp transitions impinging on flexible filler material, which would reduce sealing effectiveness.

As shown in more detail in subsequent figures, a flexible filler material 58 can substantially occupy a volume of pass-through bore 46 and undercut region(s) 52. Depending on the particular application, elongated structure 30 can be a wire, cable, and/or tube supported by filler material 58 and provides fluid, electrical, and/or signal communication between first and second volumes 36, 38. Filler material 58 can include, for example, a polymer sealant. In certain embodiments, the filler material has a coefficient of thermal expansion (CTE) of at least 100% more than a CTE of outer body 44, while maintaining a substantially hermetic seal over a temperature range of at least 100° C., or a pressure differential of at least 100 kPa.

Figure 3A:
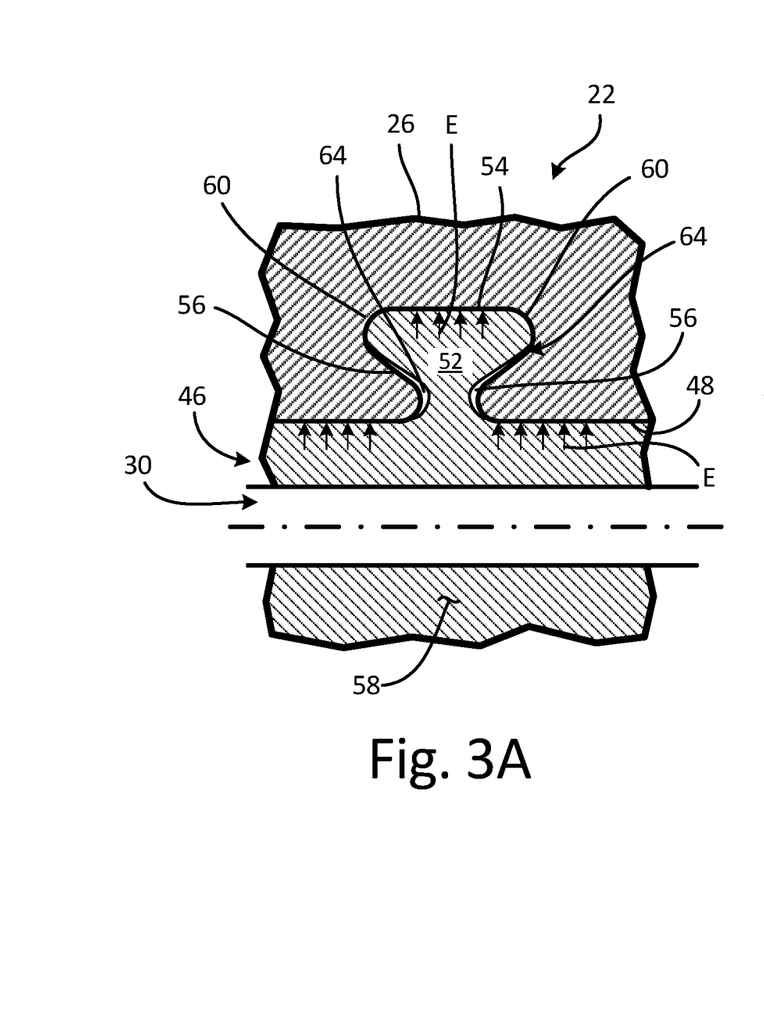
FIG. 3A is a first enlarged sectional view of a fitting with an undercut groove when the sealing material of the fitting is under thermal expansion relative to the fitting body.
Figure 3B:
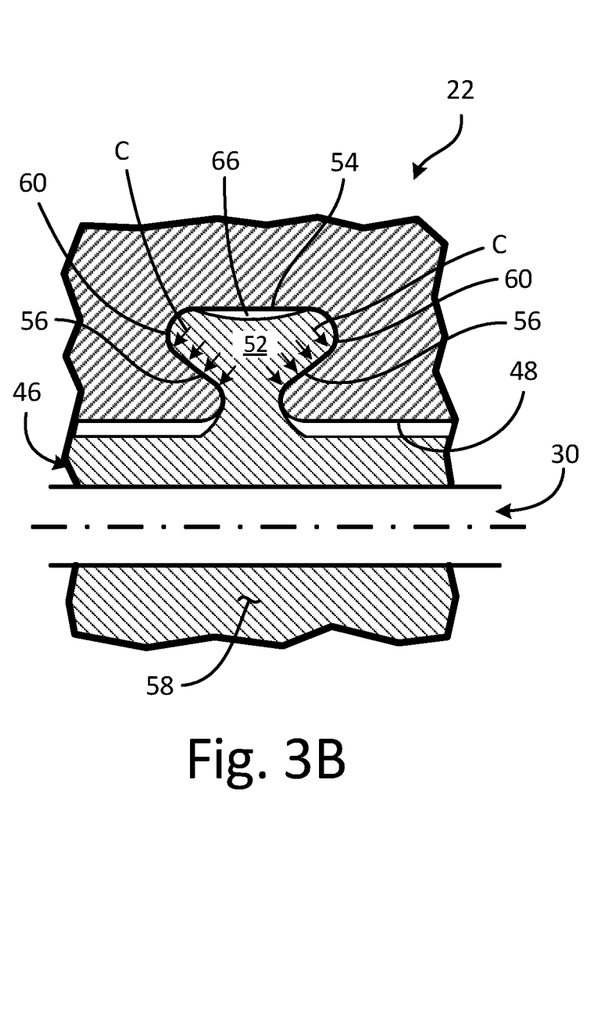
FIG. 3B is a second enlarged sectional view of the fitting in FIG. 3A when the sealing material of the fitting is under thermal contraction relative to the fitting body.

FIGS. 3A and 3B show a detailed section of FIG. 2 around undercut 52 during thermal excursion of fitting 22 between exposures to relatively hot and cold environments. This can include an overall uniform heating of one or both of first volume 36 and second volume 38 (shown in FIG. 2), which may be due to process or environmental changes. It can additionally or alternatively include conductive heat transfer into or out of fitting 22 via wall 42 (also shown in FIG. 2).

FIG. 3A shows expansion of filler material (in direction E) such as during a high temperature excursion. The filler material 58, operating as a sealant in pass-through bore 46, tends to expand faster than the metal/ceramic/composite fitting body, thus pressing against pass-through bore wall(s) 48 and expansion bearing surface 54 to form a seal in pass-through bore 44. While filler material 58 tends to pull away at contraction bearing surfaces 56 and corners 60 (see small expansion gaps 64), fluids are mostly or completely unable to escape past sealed bore walls 48 and expansion bearing surface 54.

In FIG. 3B, filler material 58 contracts (in direction C) relative to the metal/ceramic/composite fitting body such as during a low temperature excursion. As a result, filler material 58 presses against contraction bearing surfaces 56 to form a seal. While filler material 58 tends to pull away at expansion bearing surfaces 54 (see small contraction gaps 66), fluids are unable to escape past contraction bearing surfaces 56 and corners 60.

Like any configuration, performance of sealing cannot be fully maintained over an unlimited magnitude and number of thermal excursions. However, the disclosed configurations substantially improve durability and integrity of feed through fittings and seals over previous conventional arrangements. In many cases, the disclosed configurations also can reduce cost, by virtue of enabling use of higher CTE polymer sealing materials such as unfilled epoxy and unfilled polyurethane, which tend to be lower in cost than the more exotic low-CTE sealants currently required to maintain a hermetic seal in fittings without the presently described configurations.

Figure 4:
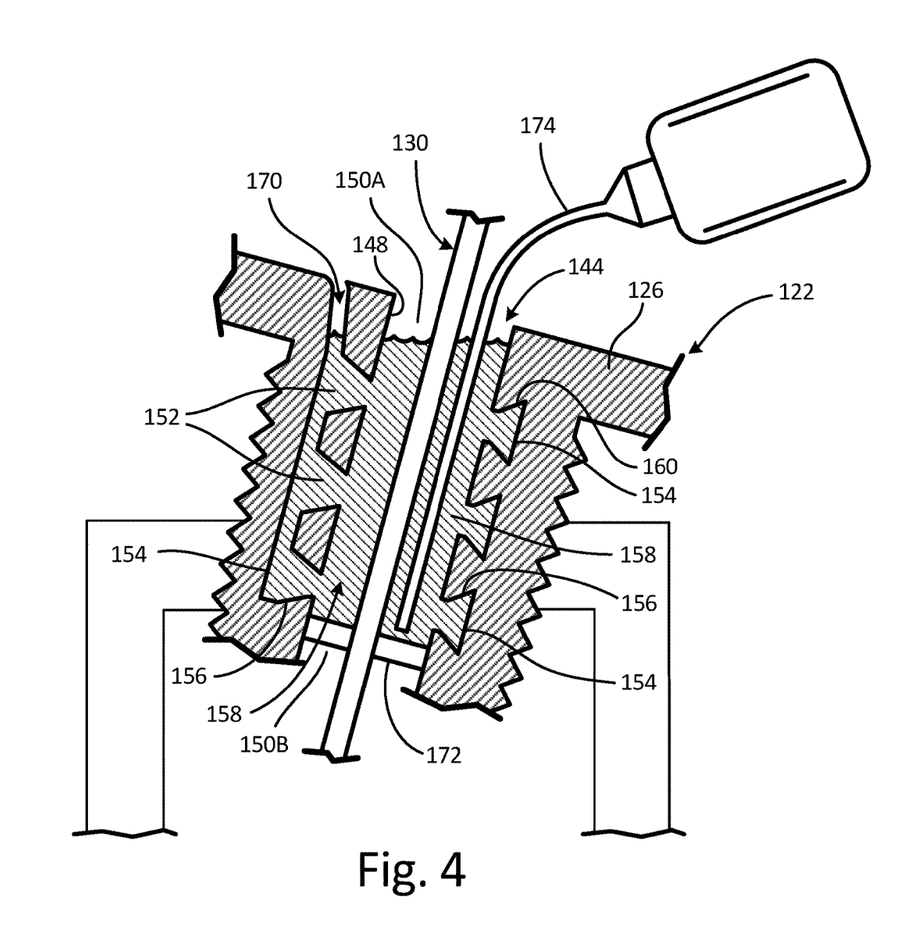
FIG. 4 shows an example fitting with an optional filler tube to minimize holes in the cured filler material.

FIG. 4 shows feed-through fitting 122, which generally has solid outer body 144, through which pass-through bore 146 is formed, defined by at least one pass-through bore wall 148, extending from first end 150A to second end 150B. At least one undercut region 152 can be formed into an outer wall (e.g., pass-through bore wall 148). Undercut regions 152 each include expansion bearing surface 154 and contraction bearing surfaces 156 which converge at corner(s) 160, which may or may not be radiused to reduce stresses.

With certain configurations, and the relatively high viscosity of certain filler materials, it can be helpful in certain embodiments to provide a filler and/or vent bore 170 to assist in pouring or otherwise filling the pass-through bore 146 and undercut regions 152 while minimizing bubbles which could negatively affect sealing performance. Here, filler/vent bore 170 in body 144 is substantially parallel and radially offset or outward from pass-through bore 146, and is in communication with at least one undercut region 152.

One end (here, second end 150B) of pass-through bore 146 can be temporarily plugged, for example, via insertion of filler plug 172 while liquid-phase filler material 158 is introduced into an opposing end (e.g., poured into first end 150A through fill tube 174). Fitting body 144, similar to those shown and described in this disclosure, can be supported in a fixture (not currently shown) upright or at a slight angle. Air is thus allowed to escape from bore 170 to minimize bubbles and gaps in the liquid-phase filler material 158 as it substantially fills pass-through bore 146 and the at least one undercut region 152. Liquid-phase filler material 158 surrounds a portion of wire/elongated structure 130 extending through a middle portion of pass-through bore 146. The liquid-phase filler material 158 is solidified to form a flexible filler material substantially occupying at least a partial volume of pass-through bore 146. It will be recognized that in certain embodiments, bore 170 can be used for filling while one end 150A or 150B of pass-through bore 146 operates as a vent.

In certain embodiments, a fitting body can be made by any conventional process. For metal fittings, they can be die or investment cast, sintered, and/or machined. To facilitate complex shapes of the undercuts, and/or to facilitate smaller fittings where conventional processes are impractical, the fitting outer body can be formed via at least one additive manufacturing process. If needed or desired, at least one bore wall can be processed to provide a smooth surface.

Though shown thus far as a threaded fitting with a single undercut, the fitting geometry can also be a compression fitting, an interference fitting, or other known or inventive fitting geometry. And while the pass-through bore shown herein has a substantially constant cross-sectional shape along a length of the outer body, this is not a requirement either. Rather the cross-sectional shape of the pass-through bore geometry, independent from the geometry of undercut(s), can be tapered and/or curved between first and second ends. Examples follow in subsequent figures. Filler material, elongated structures (i.e., wires, tubes, etc.), and optional vent bores are omitted for clarity from FIGS. 5-7.

Figure 5:
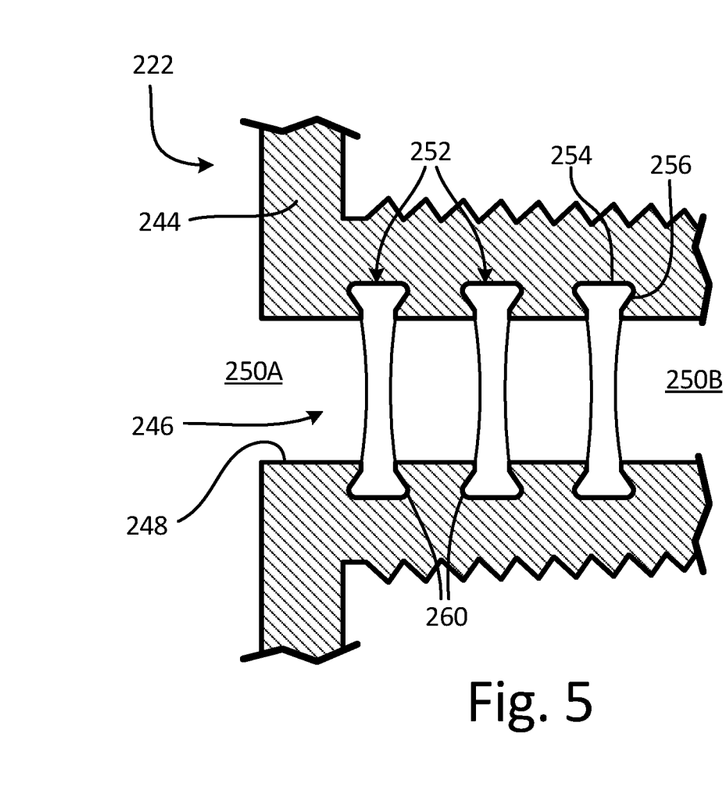
FIG. 5 is a first alternative fitting body.

FIG. 5 shows feed-through fitting 222, which generally has solid outer body 244, through which pass-through bore 246 is formed, defined by at least one pass-through bore wall 248, extending from first end 250A to second end 250B. Multiple undercut regions 252 (here, substantially identical dovetails) are formed into an outer wall (e.g., pass-through bore wall 248) and spaced longitudinally apart from one another. Undercut regions 252 each include expansion bearing surface 254 and contraction bearing surfaces 256 which converge at radiused corner(s) 260 to reduce stresses on flexible filler material (not shown in FIG. 5).

Figure 6:
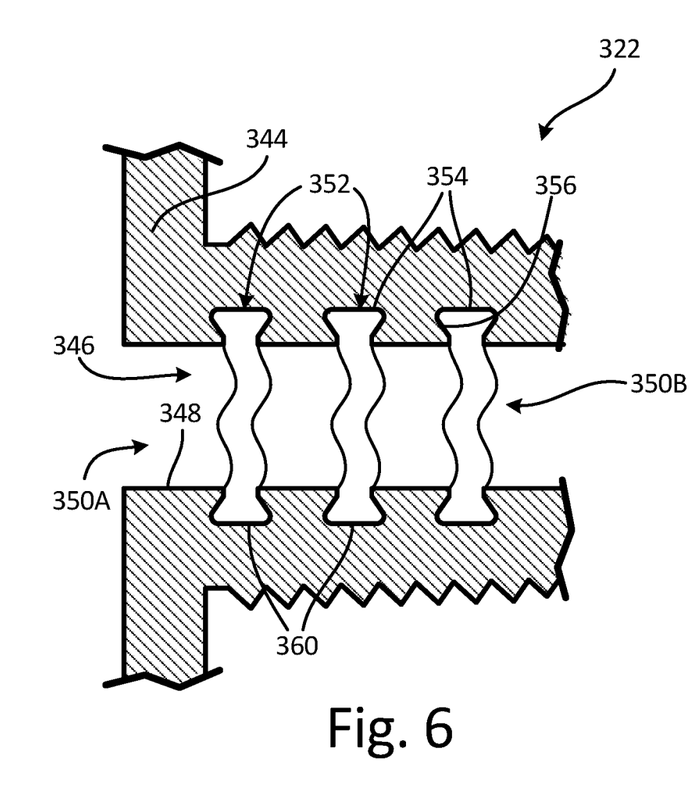
FIG. 6 is a second alternative fitting body.

In certain embodiments, a shape of the undercut portion includes a non-planar (sine wave, herringbone, etc.) path. FIG. 6 shows one such example of feed-through fitting 322, which generally has solid outer body 344, through which pass-through bore 346 is formed, defined by at least one pass-through bore wall 348, extending from first end 350A to second end 350B. Multiple undercut regions 352, spaced longitudinally apart from one another, can be formed into an outer wall (e.g., pass-through bore wall 348). Undercut regions 352 varying laterally in a sine-wave pattern around wall 348, each include expansion bearing surfaces 354 and contraction bearing surfaces 356 which converge at radiused corner(s) 360 to reduce stresses on flexible filler material (not shown in FIG. 6).

Figure 7:
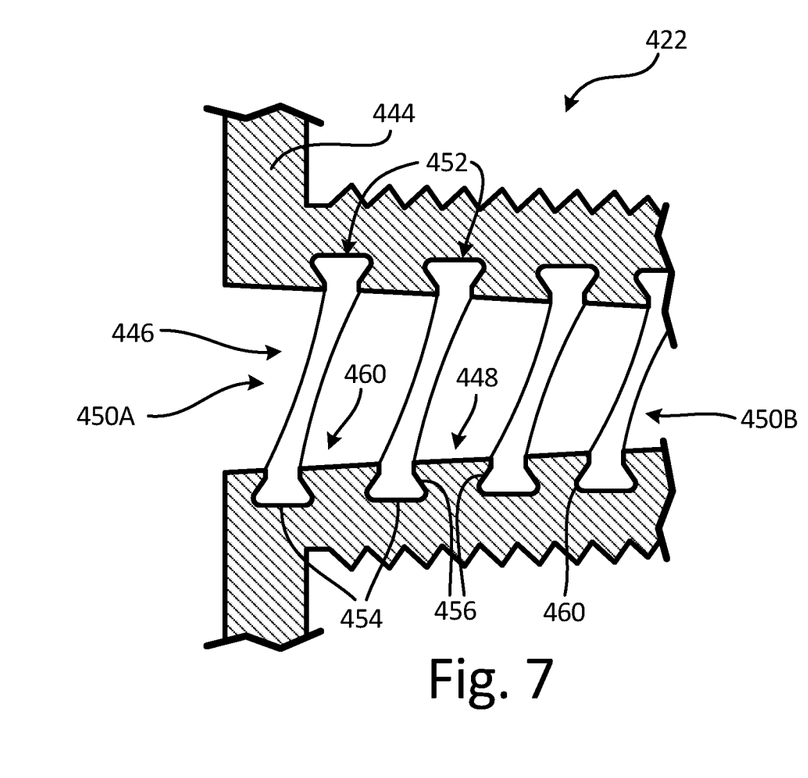
FIG. 7 is a third alternative fitting body.

In certain embodiments, a shape of the undercut portion includes a helical path. FIG. 7 shows one such example of feed-through fitting 422, which generally has solid outer body 444, through which pass-through bore 446 is formed, defined by at least one pass-through bore wall 448, extending from first end 450A to second end 450B. At least one helical undercut region 452 can be formed into an outer wall (e.g., pass-through bore wall 448). Helical undercut region(s) 452 include expansion bearing surface(s) 454 and contraction bearing surface(s) 456 which converge at radiused corner(s) 460 to reduce stresses on flexible filler material (not shown in FIG. 7).

Though FIG. 7 shows helical undercut groove 452 having at least one of a radial ramp up and a ramp down feature along a length of bore 446, helical undercut groove(s) can instead have constant (radial) depth from start to finish (see other embodiments). Similarly, a width/radial dimension (excluding undercut 452) of bore 446 varies (via tapering of wall 448) between first and second ends 450A, 450B.

Discussion of Possible Embodiments

An embodiment of a fitting assembly according to an exemplary embodiment of this disclosure, among other possible things, includes a fitting having at least a solid outer body, a pass-through bore, and at least one undercut region. The pass-through bore is defined by at least one pass-through bore wall, extending longitudinally through a length of the outer body from a first end to a second end. The at least one undercut region is formed into the at least one pass-through bore wall, and includes at least one expansion bearing surface disposed radially outward of at least one contraction bearing surface.

The assembly of the preceding paragraph can optionally include, additionally and/or alternatively, any one or more of the following features, configurations and/or additional components:

A further embodiment of the foregoing assembly, further comprising a flexible filler material substantially occupying a volume of the pass-through bore and the undercut region.

A further embodiment of any of the foregoing assemblies, wherein the filler material includes a polymer sealant having a CTE of at least 100% more than a CTE of the outer body, while maintaining a hermetic seal over a temperature range of at least 100° C., or a pressure differential of at least 100 kPa.

A further embodiment of any of the foregoing assemblies, further comprising at least one elongated structure extending through the pass-through bore and supported by the filler material.

A further embodiment of any of the foregoing assemblies, wherein the at least one expansion bearing surface and the at least one contraction bearing surface converge at a radiused corner.

A further embodiment of any of the foregoing assemblies, wherein the at least one expansion bearing surface and at least one contraction bearing surface define at least one dovetail undercut.

A further embodiment of any of the foregoing assemblies, further comprising a filler bore formed in the body substantially parallel and radially offset from the pass-through bore, the filler bore in communication with the at least one undercut region.

A further embodiment of any of the foregoing assemblies, wherein the fitting is selected from one of: a threaded fitting, a contraction fitting, and an interference fitting.

A further embodiment of any of the foregoing assemblies, wherein the pass-through bore has a substantially constant cross-sectional shape along a length of the outer body.

A further embodiment of any of the foregoing assemblies, wherein a shape of the undercut portion includes a non-planar path or a helical path.

A further embodiment of any of the foregoing assemblies, wherein the helical path includes at least one helical undercut groove having constant depth from start to finish.

A further embodiment of any of the foregoing assemblies, wherein the bore or the at least one helical undercut groove has at least one of a ramp up feature and a ramp down feature.

An embodiment of a vessel according to an exemplary embodiment of this disclosure, among other possible things, includes at least one wall separating a first volume and a second volume to be sealed therefrom; at least one fitting assembly according to any of the foregoing fitting assemblies; and an elongated structure for providing communication through the at least one wall between the first and second volumes.

The vessel of the preceding paragraph can optionally include, additionally and/or alternatively, any one or more of the following features, configurations and/or additional components:

A further embodiment of the foregoing vessel, wherein at least one of the first and second volumes operate in a vacuum.

A further embodiment of any of the foregoing vessels, wherein at least one of the first and second volumes operate with a pressure differential of at least 100 kPa therebetween.

A further embodiment of any of the foregoing vessels, wherein the vessel is an environmental protection enclosure.

An embodiment of a method according to an exemplary embodiment of this disclosure, among other possible things, includes supporting a fitting in a fixture, the fitting comprising: a solid outer body; a pass-through bore, defined by at least one pass-through bore wall, extending longitudinally through a length of the outer body from a first end to a second end; and at least one undercut region formed into an outer wall defining the pass-through bore, the at least one undercut region including at least one expansion bearing surface disposed radially outward of at least one contraction bearing surface; inserting a filler plug into the first end of the outer body; inserting an elongated structure through the bore and the filler plug; introducing a liquid-phase filler material into the second end of the outer body, surrounding the elongated structure and substantially filling the pass-through bore; and solidifying the liquid-phase filler material to form a flexible filler material substantially occupying a volume of the pass-through bore and the undercut region, supporting the elongated structure for providing communication between a first volume and a second volume.

The method of the preceding paragraph can optionally include, additionally and/or alternatively, any one or more of the following features, configurations, steps, and/or additional components:

A further embodiment of any of the foregoing methods, further comprising manufacturing the fitting outer body via at least one additive manufacturing process.

A further embodiment of any of the foregoing methods, further comprising processing the at least one bore wall to provide a smooth surface.

A further embodiment of any of the foregoing methods, wherein liquid-phase filler material is introduced into at least one filler bore formed in the body substantially parallel and radially offset from the pass-through bore, the filler bore in communication with the at least one undercut region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A vessel comprising:
   at least one wall separating a first volume and a second volume to be sealed therefrom;
   an elongated structure providing communication through the wall between the first and second volumes;
   a fitting assembly including a fitting secured to the at least one wall, the at least one fitting comprising:
   a solid outer body;
   a pass-through bore, defined by at least one pass-through bore wall, extending longitudinally through a length of the outer body from a first end to a second end;
   at least one undercut region formed into the at least one pass-through bore wall, the at least one undercut region including at least one expansion bearing surface disposed radially outward of at least one contraction bearing surface; and
   a flexible filler material substantially occupying a volume of the pass-through bore and the undercut region, the flexible filler material retaining the elongated structure in the bore while sealing the first volume from the second volume.

2. The vessel of claim 1, wherein at least one of the first and second volumes operates in a vacuum.

3. The vessel of claim 1, wherein at least one of the first and second volumes operates with a pressure differential of at least 100 kPa therebetween.

4. The vessel of claim 1, wherein the vessel is an environmental protection enclosure.

5. The vessel of claim 1, wherein the filler material includes a polymer sealant having a Coefficient of Thermal Expansion (CTE) of at least 100% more than a CTE of the outer body, while maintaining a hermetic seal over a temperature range of at least 100° C., or a pressure differential of at least 100 kPa.

6. The vessel of claim 1, wherein the at least one expansion bearing surface and the at least one contraction bearing surface converge at a radiused corner.

7. The vessel of claim 6, wherein the at least one expansion bearing surface and at least one contraction bearing surface define at least one dovetail undercut.

8. The vessel of claim 1, and further comprising a filler bore formed in the body substantially parallel and radially offset from the pass-through bore, the filler bore in communication with the at least one undercut region.

9. The vessel of claim 1, wherein the fitting is selected from one of: a threaded fitting, a compression fitting, and an interference fitting.

10. The vessel of claim 1, wherein the pass-through bore has a substantially constant cross-sectional shape along a length of the outer body.

11. The vessel of claim 1, wherein a shape of the undercut region includes a non-planar path, or a helical path.

12. The vessel of claim 11, wherein the helical path includes at least one helical undercut groove having constant depth from start to finish.

13. The vessel of claim 12, wherein the bore or the at least one helical undercut groove has at least one of a ramp up feature and a ramp down feature.

14. A method comprising:
   supporting a fitting in a fixture or in at least one wall separating a first volume and a second volume to be sealed therefrom, the fitting comprising:
   a solid outer body;
   a pass-through bore, defined by at least one pass-through bore wall, extending longitudinally through a length of the outer body from a first end to a second end; and
   at least one undercut region formed into an outer wall defining the pass-through bore, the at least one undercut region including at least one expansion bearing surface disposed radially outward of at least one contraction bearing surface;
   inserting a filler plug into the first end of the outer body;
   inserting an elongated structure through the bore and the filler plug, the elongated structure providing communication through the wall between the first and second volumes;
   introducing a liquid-phase filler material into the second end of the outer body, surrounding the elongated structure and filling at least a portion of the pass-through bore;
   solidifying the liquid-phase filler material to form a flexible filler material occupying at least part of a volume of the pass-through bore and the undercut region, retaining the elongated structure in the bore for providing communication between a first volume and a second volume while sealing the first volume from the second volume; and
   securing the fitting to the at least one wall.

15. The method of claim 14, and further comprising manufacturing the fitting outer body via at least one additive manufacturing process.

16. The method of claim 14, and further comprising: processing the at least one bore wall to provide a smooth surface.

17. The method of claim 14, wherein liquid-phase filler material is introduced into at least one filler bore formed in the body parallel and radially offset from the pass-through bore, the filler bore in communication with the at least one undercut region.

18. The method of claim 14, wherein at least one of the first and second volumes operates in a vacuum.

19. The method of claim 14, wherein at least one of the first and second volumes operates with a pressure differential of at least 100 kPa therebetween.

20. The method of claim 14, wherein the vessel is an environmental protection enclosure.

* * * * *